United States Patent
Holman et al.

[11] Patent Number: 6,029,933
[45] Date of Patent: Feb. 29, 2000

[54] FIRE RESISTANT PRESSURE RELIEF PANEL ASSEMBLY

[75] Inventors: Wrenn P. Holman, Federal Way; Robert W. Dost, Kent; James W. Baldwin, Renton, all of Wash.

[73] Assignee: The Boeing Company, Seattle, Wash.

[21] Appl. No.: 08/910,576

[22] Filed: Aug. 1, 1997

[51] Int. Cl.[7] .................................................. B64D 25/00
[52] U.S. Cl. .................................. 244/118.5; 244/129.2; 244/129.4; 52/1; 52/98
[58] Field of Search ............................. 244/129.2, 129.4, 244/118.5; 52/98, 1

[56] References Cited

U.S. PATENT DOCUMENTS

| | | | |
|---|---|---|---|
| 4,454,686 | 6/1984 | Stapenell | 49/141 |
| 4,498,261 | 2/1985 | Wilson et al. | 52/1 |
| 4,646,993 | 3/1987 | Baetke | 244/117 R |
| 4,899,960 | 2/1990 | Hararat-Tehrani et al. | 52/1 |
| 5,048,239 | 9/1991 | Filitz et al. | 52/1 |
| 5,069,401 | 12/1991 | Shepherd et al. | 244/118.5 |
| 5,085,017 | 2/1992 | Hararat-Tehrani | 52/1 |
| 5,461,831 | 10/1995 | Michal | 52/1 |
| 5,606,829 | 3/1997 | Hararat-Tehrani | 52/1 |

FOREIGN PATENT DOCUMENTS 0 443 182 B1  8/1991  European Pat. Off. .

*Primary Examiner*—J. Woodrow Eldred
*Attorney, Agent, or Firm*—Christensen O'Connor Johnson & Kindness PLLC

[57] ABSTRACT

A decompression panel assembly (12) for use in an aircraft separation structure (14). The panel assembly includes a support pan (26) having an opening (28), a bull nose (64) extending outwardly from the support pan at the opening's edge, and a recess (62) surrounding the bull nose. An inner seal (70) is sized and located within the recess (62). A retaining ring (22) is provided and includes a number of fingers (84) formed from spaced-apart slits (86) extending into the retaining ring (22) from the ring's inner edge. The assembly (12) further includes a pressure relief panel (24) shaped similar to the support pan opening shape, though sized slightly larger. The pressure relief panel (24) is held between the support pan bull nose (64) and the retaining ring (22) during non-decompression use. A number of index pins (94) interconnect between the retaining ring and the support pan. A grill (30) is attached to the support pan to protect the pressure relief panel. During a rapid decompression event, the retaining ring fingers (84) flex slightly to reduce the holding force applied to the pressure relief panel (24), thus allowing the pressure relief panel to quickly and entirely detach from the assembly (12).

32 Claims, 5 Drawing Sheets

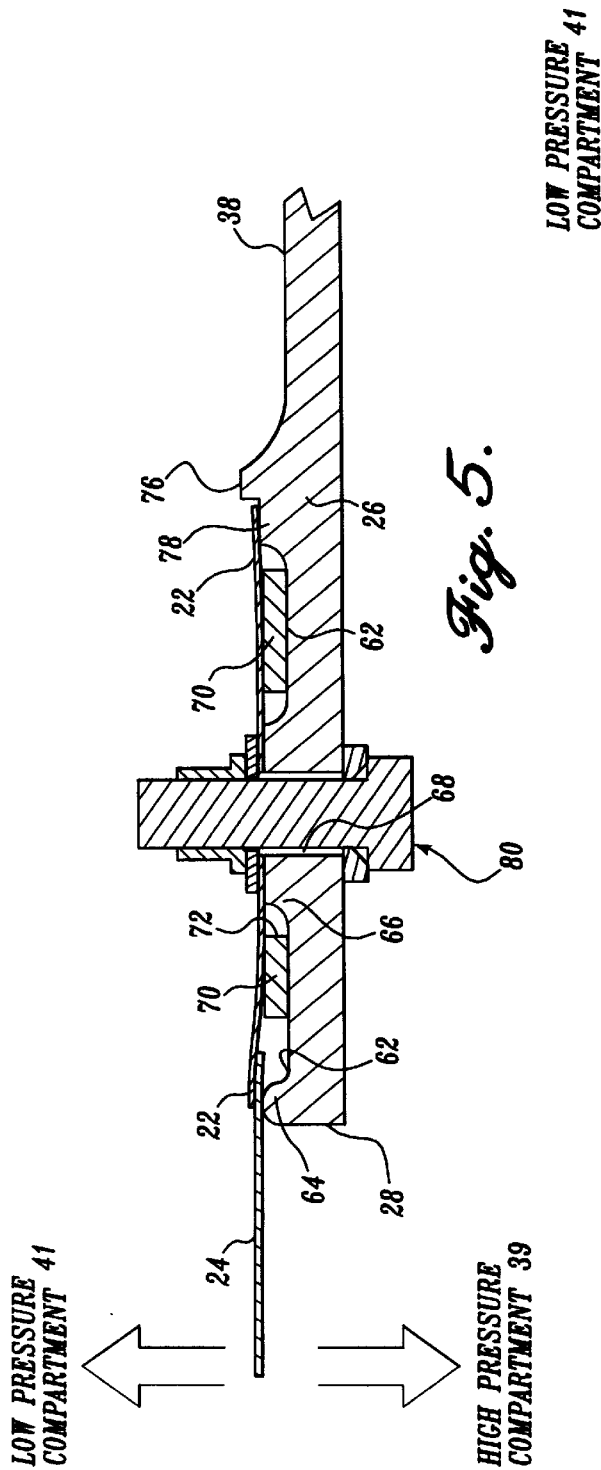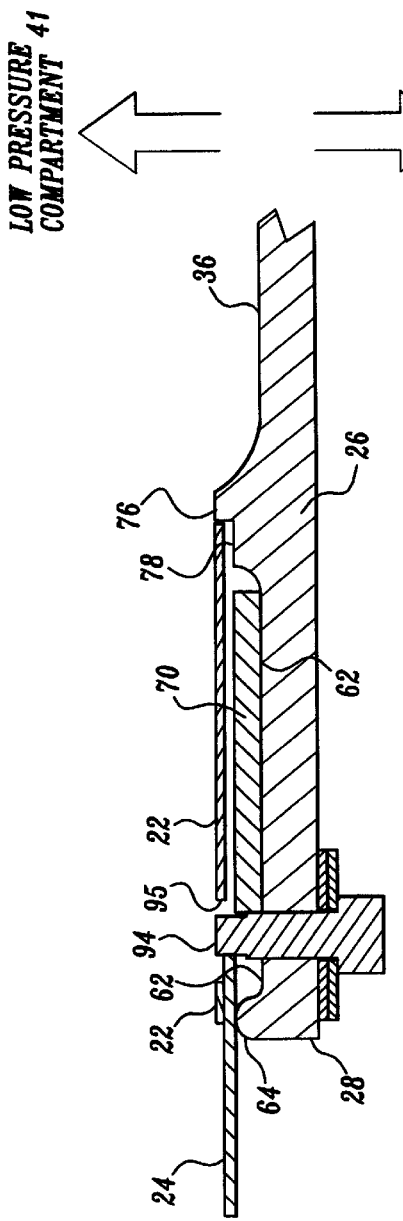

FIRE RESISTANT PRESSURE RELIEF PANEL ASSEMBLY

FIELD OF THE INVENTION

The present invention relates to decompression panels for use in a separation structure, such as a bulkhead or wall, and more particularly, to decompression panels having a pressure relief panel that releases entirely from the device during rapid decompression of an aircraft compartment.

BACKGROUND OF THE INVENTION

An aircraft is typically subdivided into two or more compartments separated by structures, e.g., walls, bulkheads, floors, etc. During flight, these compartments are positively pressurized relative to the atmospheric pressure outside the aircraft. If an opening is created between one compartment and the exterior atmosphere, the pressure difference causes a sudden exodus of interior aircraft air. As air is rushing out the opening, an almost immediate propagation of the pressure difference causes the other compartments to also attempt to decompress.

To accommodate this chain reaction of pressure differences, it is often necessary to provide decompression panels between compartments to quickly equalize the pressure differential. A difference in pressure between compartments that is not relieved rapidly could lead to deformation of a separation structure and/or surrounding components. Known decompression panels have a sandwich type construction in which a pressure relief panel is released to fully reveal an opening through the separation structure. This allows air to quickly pass therethrough and quickly relieve the pressure difference. These types of decompression panels are sometimes referred to as full release blowout panels.

There are other aircraft requirements, however, that must be considered along with the requirement to allow air to pass between compartments during decompression. In particular, some aircraft compartments rely on oxygen suffocation to extinguish fires. This requires the separation structures to act as oxygen-tight fire barriers which do not allow fire or oxygen to pass through them. In such cases, it would be advantageous to use a pressure relief panel that could quickly allow pressure equalization between compartments during a rapid decompression event, but would otherwise resist the spread of fire between compartments. This present invention is directed to providing such a panel.

SUMMARY OF THE INVENTION

The present invention provides a fire-resistant decompression panel assembly for use at a separation structure to quickly relieve pressure differences between two adjacent aircraft compartments. A decompression panel assembly formed in accordance with the present invention includes a support pan having a first surface, an opening, and a raised portion (e.g., a bull nose) surrounding the periphery of the opening and extending normally outward from the first surface. A pressure relief panel is used to cover the support pan opening and is therefore sized slightly larger than the opening. A retaining ring connects to the support pan such that the outer edge of the pressure relief panel is located and held between the raised portion and the retaining ring.

The retaining ring includes a number of segments or fingers available to flex independently of one another. In one embodiment of a panel assembly formed in accordance with aspects of this invention, the retaining ring is a single rectangular member having fingers formed from a number of spaced-apart slits extending into the retaining ring along the ring's inner periphery. Stress relief holes are provided at the ends of the slits to prevent crack growth initiation.

During normal (non-decompression) use, the fire resistant pressure relief panel is clamped between the retaining ring and the raised portion. The contacts between the ring, the pressure relief panel, and the raised portion are substantially airtight contacts, so that the panel assembly can prohibit the flow of oxygen and smoke between compartments and thereby resist the spread of fire and smoke. During a decompression event, one or more of the retaining ring fingers flexes slightly outward and in so doing reduces the holding force applied to the fire resistant pressure relief panel. This allows the pressure difference between compartments to easily and quickly detach the entire panel from the assembly.

In accordance with further aspects of this invention, the pressure relief panel is made of a fire resistant fiberglass and the retaining ring is fabricated from nickel chromium stainless steel. The panel assembly is preferably oriented in an upright plane with the support pan opening, pressure relief panel, and retaining ring rectangularly shaped and oriented with their longitudinal axes extending laterally.

In accordance with other aspects of this invention, there are a number of optional features that may be included to enhance particular aspects of the panel's performance. To help centrally align the pressure relief panel during assembly, a number of index pins interconnect between the support pan and the retaining ring. In particular, the index pins extend from the support pan first surface and protrude through clearance holes provided in the retaining ring. The index pins are located such that the pressure relief panel edges just contact the pins. The pins therefore act as stop guides. The support pan may further include a recess surrounding the raised portion. An inner seal is sized and located within the recess, and is pocketed between the support pan and the retaining ring during use. The inner seal acts as an ablatant heat sink.

The panel assembly may also include a grill for use in protecting the fire resistant pressure relief panel from objects within the compartment. In one embodiment, the support pan includes a second surface having a peripheral flange extending normally therefrom about the pan opening. A number of secondary pressure relief holes extend through both the grill sides and the flange to provide relief pressure equalization should the face of the grill be blocked. The grill is attached to the flange and generally covers the entire support pan opening. The grill is preferably formed by machining or casting a beat tolerant material, such as aluminum, titanium, cobalt, steel, etc.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a detail cross-sectional view taken along lines 5—5 in FIG. 4; and

FIG. 6 is a detail cross-sectional view taken along lines 6—6 in FIG. 4.

DETAILED DESCRIPTION OF THE PREFERRED EMBODIMENT

Figure 1:
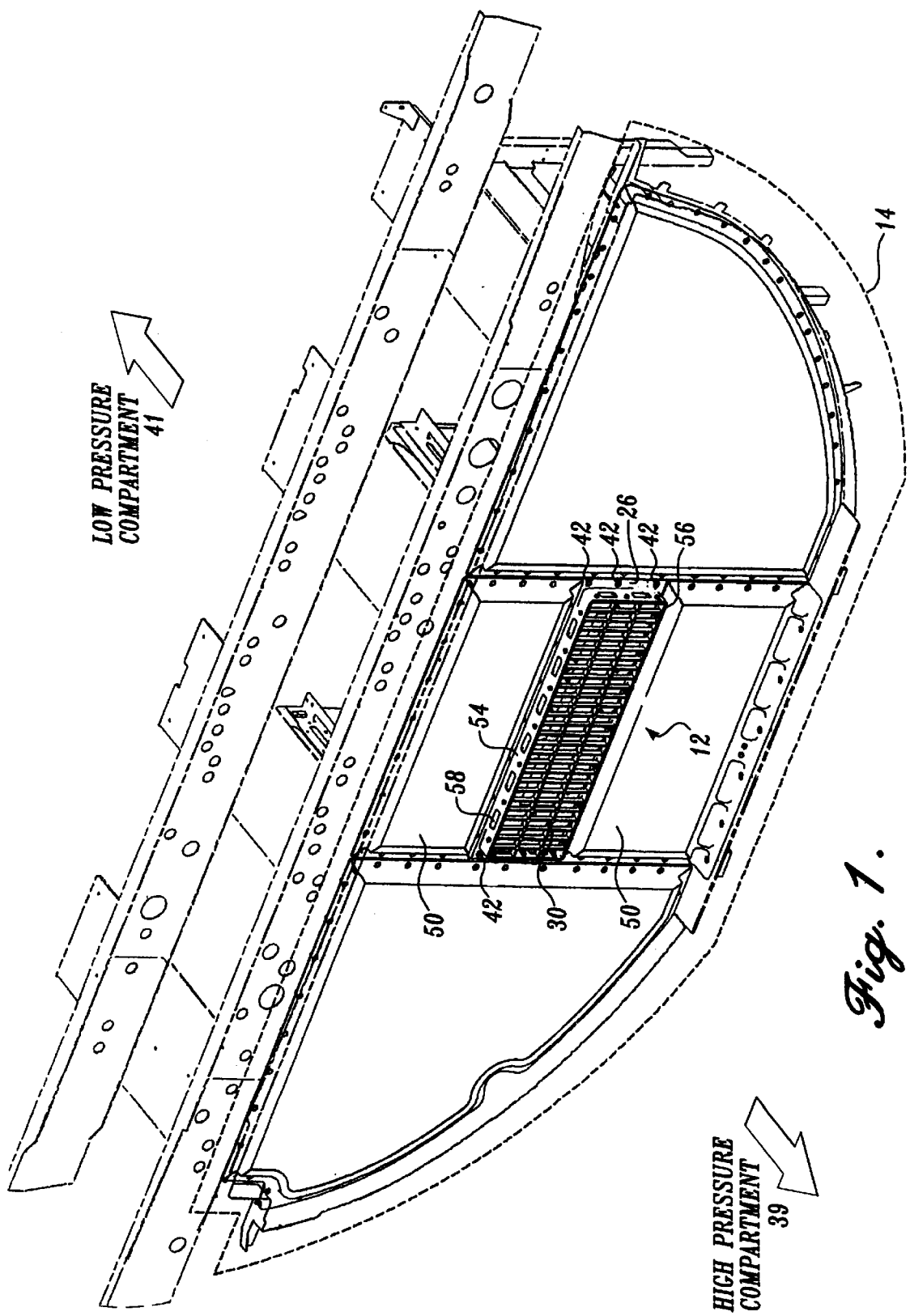
FIG. 1 is a perspective view of a fire-resistant pressure relief panel assembly formed in accordance with the present invention as installed in a lower cargo hold forward bulkhead.

FIG. 1 is a perspective view of one embodiment of a decompression panel assembly 12 formed in accordance with the present invention. The assembly is shown installed in a bulkhead (i.e., more generally, a separation structure 14) that divides a cargo bay and an electronics bay. The view of FIG. 1 is taken from the cargo bay, looking forward. This particular separation structure and intercompartment location was selected for illustrative purposes only. The assembly may be secured through other separation structures in an aircraft or space vehicle at locations in which sudden decompression may be required between adjacent compartments.

Figure 2:
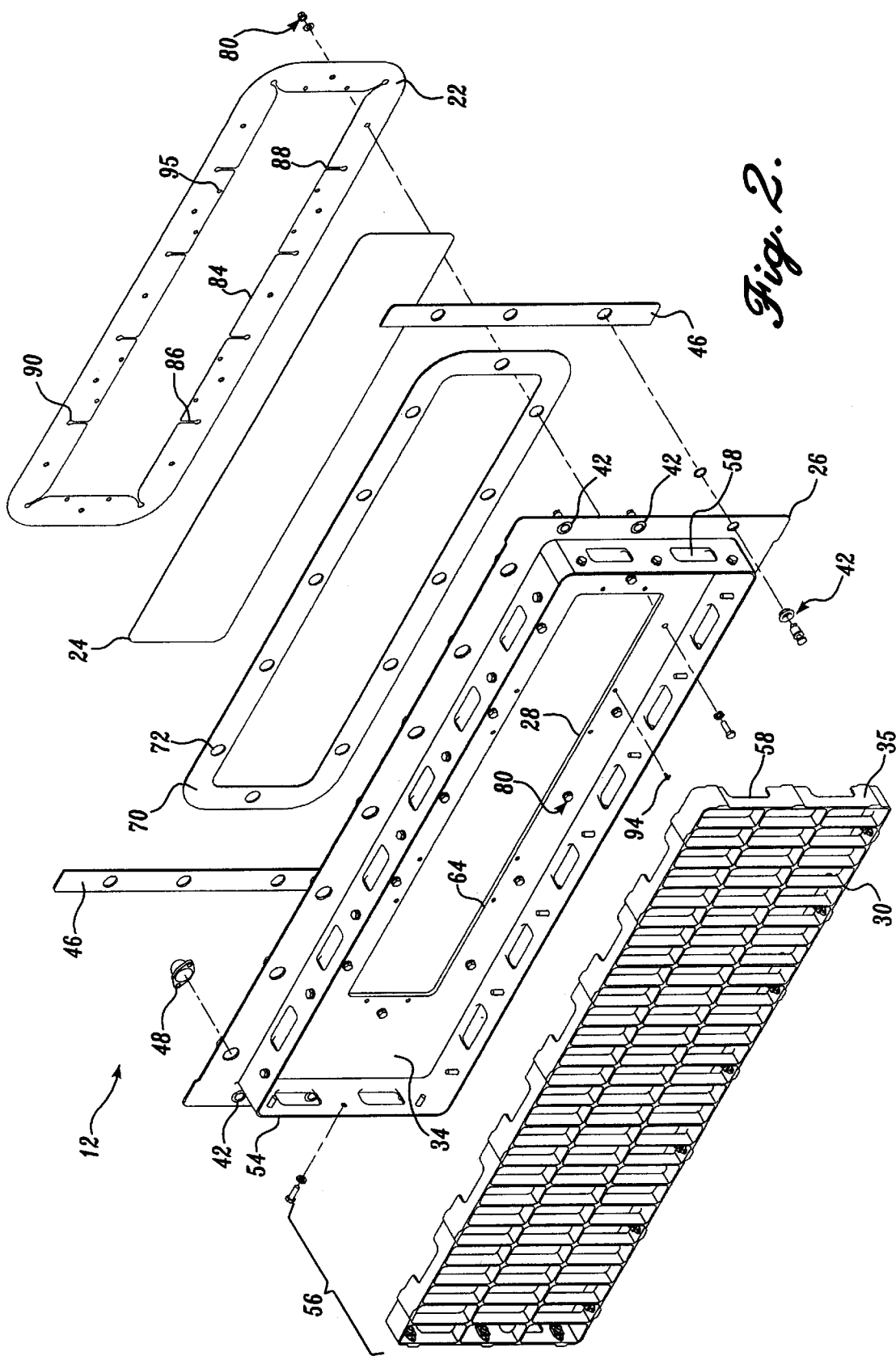
FIG. 2 is an exploded perspective view of the individual components of the assembly shown in FIG. 1, the components being positioned in an aligned though unassembled manner.

Referring to FIG. 2, the decompression panel assembly 12 generally includes a retaining ring 22, a fire resistant pressure relief panel 24, and a support pan 26 having an opening 28. During normal use, the pressure relief panel 24 covers the support pan opening 28 and is held in place by the retaining ring 22. The pressure relief panel effectively forms a substantially airtight seal around the opening 28 to resist the passage of flame or smoke from one adjacent compartment to the next. Should the pressure difference between compartments change rapidly, the retaining ring 22 flexes slightly to allow the pressure relief panel 24 to quickly and fully release from the assembly 12 and reveal the support pan opening 28, thereby allowing pressure to quickly equalize between adjacent compartments. The panel assembly 12 optionally includes a grill 30 to prohibit the pressure relief panel from being unintentionally dislodged (as might easily happen from luggage or personnel moving about in the cargo bay.)

Figure 3:
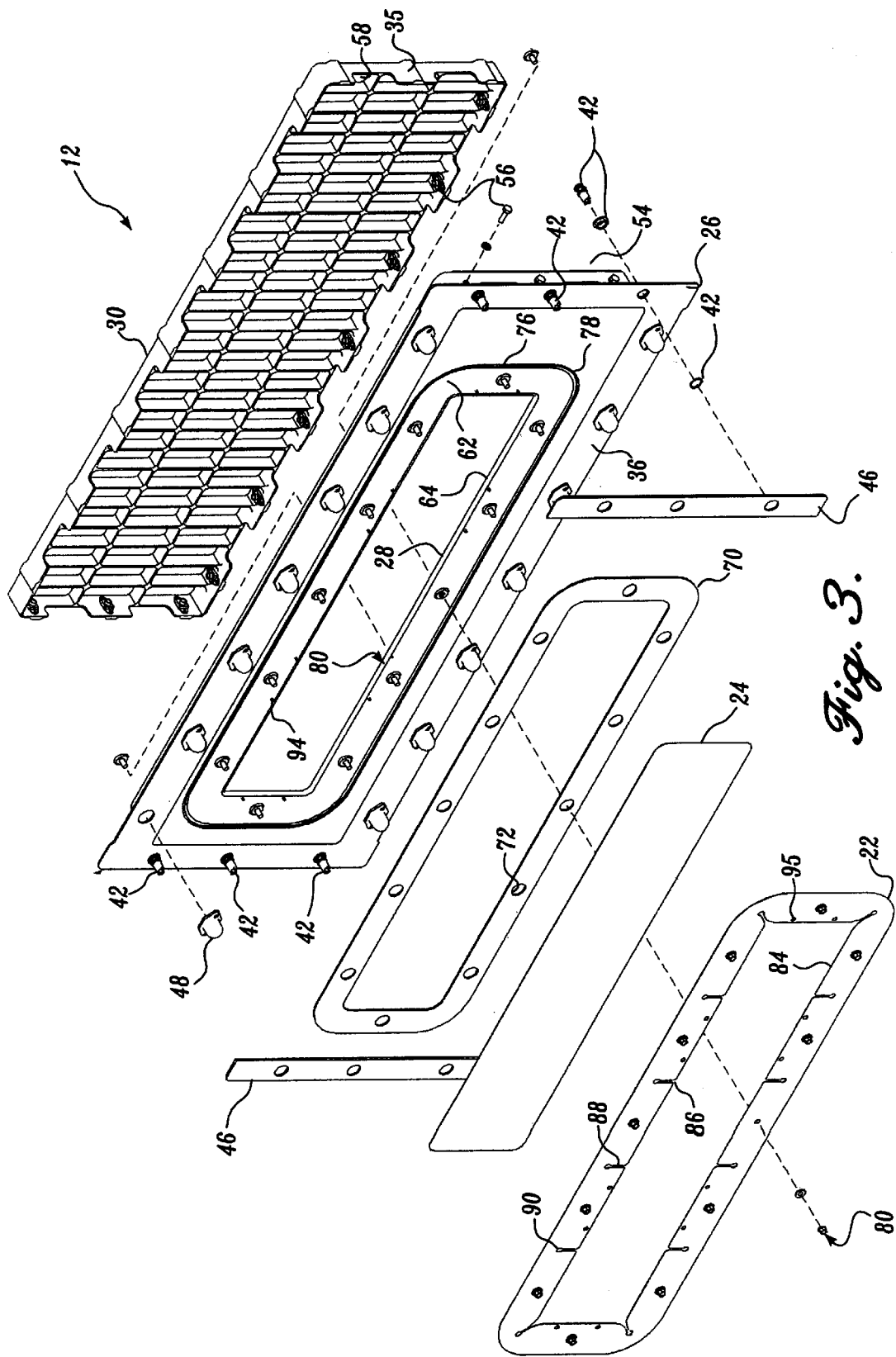
FIG. 3 is an exploded perspective view of the opposite side of the individual components of the assembly shown in FIG. 1.

In more detail, the support pan 26 is a rectangularly shaped planar member having a first surface 34 and a second surface 36 (see FIG. 3.) As shown in FIG. 3, the opening 28 is generally positioned in the center of the pan. It is preferable to also use a rectangular or square opening, and, if possible, to orient the assembly 12 in the separation structure, so that the plane of the assembly is upright and the assembly's longitudinal axis is lateral as illustrated in FIG. 1. This orientation helps to further reduce the spread of fire between compartments by providing the least amount of vertical distance available for a flame to propagate. The support pan 26 is preferably formed by machining or casting a heat tolerant material, e.g., aluminum, titanium, cobalt, steel, etc. If aluminum is selected, it should be increased in gauge thickness to counteract any metal degradation effects during a fire. An average support pan thickness of about 0.15 inches to about 0.20 inches has been shown to work well.

The decompression panel assembly 12 is a one-way decompression relief panel, i.e., the pressure relief panel 24 is intended to fully release in one direction. In FIGS. 1–4, the support pan first surface 34 (shown best in FIG. 2) is the side that faces the high pressure compartment 39. The support pan second surface 36 (shown best in FIG. 3) is the side that faces the low pressure compartment 41. Shown in FIG. 1, the support pan 26 is installed in the separation structure 14 using a number of fasteners 42. The fasteners 42 are inserted through the support pan and edge seals 46, through holes in the separation structure 14, and into the capped receptacles common to the separation structure on the low pressure compartment side. The edge seals 46 keep the pressure relief assembly in substantially airtight contact with the separation structure. The seals 46 are preferably made of a heat resistant, nonflammable material, such as silicone.

It is important that the support pan fasteners 42 are connected to portions of the separation structure 14 that are themselves strong enough to maintain their shape and position during a rapid decompression event. Exemplary structures include support stanchions, contour rails, intercostals, floor beams, etc. Preferred fasteners 42 include cadmium steel quarter-turn stud assemblies having a pin, snap ring, and mating grommet. These types of fasteners are preferred because they allow quick and easy removal of the decompression panel assembly should the need arise, e.g., for maintenance or compartment access.

Referring to FIG. 3, the decompression panel assembly 12 for this application further includes capped receptacles 48 positioned near the support pan's 26 upper and lower side edges. The capped receptacles attach adjacent panel partitions 50 (see FIG. 1) above and below the decompression panel assembly.

Referring to FIG. 2, the support pan first surface 34 includes a peripheral flange 54 extending normally outward therefrom for use in connecting the grill 30 to the support pan 26. The peripheral flange 54 is made of a heat tolerant nonflammable material integrally formed with the other support pan portions. A preferred grill material is 7050-T7451 aluminum. The grill 30 has a depth that is approximately equal to the depth of the support pan peripheral flange 54. The grill is sized slightly smaller than the area bounded by the peripheral flange 54. The grill 30 therefore inserts into the flange 54 and is held by multiple grill fasteners 56 passed through the peripheral flange 54 and into side surfaces 35 of the grill 30. The fasteners 56 shown in FIG. 2 include titanium hex head screw bolts, cadmium plated countersink washers, and steel cadmium plated nut plates. The nut plates are riveted to the grill 30 and are part of its assembly. Both the peripheral flange 54 and the grill side surfaces 35 include secondary pressure relief holes 58 to permit air to pass into the support pan opening 28 in the event the outer grill surface is obstructed by foreign objects.

Referring to FIG. 3, the support pan second surface 36 includes a recess 62 that extends around the pan opening 28 and has a width that is greater than its depth. Referring to FIG. 5, the recess 62 is bounded at the support pan opening by a raised portion 64 (a bull nose is shown) that extends normally outward from the recess surface. Circular integral spacing mounts 66 are located at spaced intervals along the recess 62 and extend outward from the support pan recess surface a distance slightly less than the distance extended outward by the bull nose 64. A hole 68 is located through the support pan 26 at each integral spacing mount 66.

Still referring to FIG. 5, a nonflammable, noncompressed inner seal 70 made from silicone foam rubber is positioned within the recess 62 and serves as an ablatant heat sink to further diminish the heat transferred from the support pan 26 to the retaining ring 22. The inner seal 70 has a thickness approximately equal to the recess depth. Seal holes 72 are provided along the inner seal 70 to accommodate the integral spacing mounts 66. During use, the seal 70 is preferably not compressed or pinched by the retaining ring and the support pan.

The support pan 26 further includes an outer ring ridge 76 that surrounds the recess 62. Between the recess 62 and the outer ring ridge 76 is a stepped index ring surface 78. The retaining ring 22 is a non-formed sheet metal part profiled slightly smaller in size than the area bounded by the outer ring ridge 76. During normal use, the retaining ring 22 is positioned adjacent to the support pan 26 such that the retaining ring's outer edge is indexed by the outer ring ridge 76, and the retaining ring's profiled inner edge is positioned near the bull nose 64. The retaining ring contacts the support pan 26 at the integral spacing mounts 66 and the stepped surface 78. The retaining ring 22 is held in this position via conventional bolt/nut combination type fasteners 80 inserted through the connection mount holes 68.

As shown best in FIGS. 5 and 6, the pressure relief panel 24 is positioned over the support pan opening 28 and is held in place about its periphery by a clamping force provided between the retaining ring 22 and the support pan bull nose 64. The clamping force is created when the retaining ring 22 closely contacts the integral spacing mounts 66. Since the mounts 66 extend outward slightly less distance than the bull nose 64 and the retaining ring 22 has some rigidity, the retaining ring 22 tends to push against the bull nose 64, thus effectively forming a clamp. Because most of the pressure relief panel 24 periphery is so held (with exceptions discussed below), the decompression panel assembly 12 acts as an oxygen and smoke barrier to aid in stopping fire hazards from spreading between compartments.

Equally important, is the ability of a decompression panel assembly 12 formed in accordance with the present invention to quickly release from the clamping force during a rapid decompression event. To ensure a satisfactory response, the retaining ring 22 is segmented (see FIG. 4) in a manner that permits the ring to flex or twist within the elastic range in response to pressure differences between adjacent compartments. In so flexing, portions of the retaining ring move laterally outward an amount sufficient to reduce the clamping force provided by the retaining ring 22 and the bull nose 64 at that location, thereby releasing a portion of the pressure relief panel 24. Once even a small portion of the pressure relief panel 24 is dislodged, the entire panel is easily suctioned out of the assembly and into the low pressure compartment 41. After the pressure relief panel 24 has fully released, the support pan opening 28 is exposed and allows rapid equalization of pressure between adjacent compartments. Optional measures may be taken to reduce or add to the amount of clamping force provided between the retaining ring 22 and the bull nose 64, such as polishing the bull nose, altering the gauge thickness of the retaining ring 22, altering the height of the integral spacing mounts.

In the embodiments of FIGS. 1–6, the retaining ring 22 is a single nonfrangible member having a number of segments or fingers 84 formed between slits 86 that are located at intervals along the inner edge of the retaining ring 22. The ring inner edge includes curved corners 88 at each slit 86 so that the slit edges do not catch on one another. Stress relief holes 90 are recommended to be formed at the slit's inner end to prevent crack propagation. The various dimensions of the slits will vary depending on the response characteristics required in a particular application.

The retaining ring 22 is formed of a fire resistant material having a melting temperature that is much higher than the temperature of a fire anticipated for either adjacent compartment. Nickel chromium stainless steel 17-7PH has been shown to work well. The pressure relief panel 24 is formed of a heat and fire resistant material that is also flexible, e.g., BMS 8-223 fiberglass, etc. The preferred ring is nonfrangible, that is it will not break during a decompression event, but will instead only flex. Both the pressure relief panel 24 and retaining ring 22 should be sized to provide the appropriate amounts of flexibility and rigidity. In one test assembly, a pressure relief panel of 0.021 inches having 0.2 inches of its outer periphery sandwiched between the support pan bull nose and the retaining ring worked well. A retaining ring of 0.016 inches thickness produced a lateral movement of 0.032 inches which caused the pressure relief panel 24 to release in less than one second after a rapid decompression event.

Figure 4:
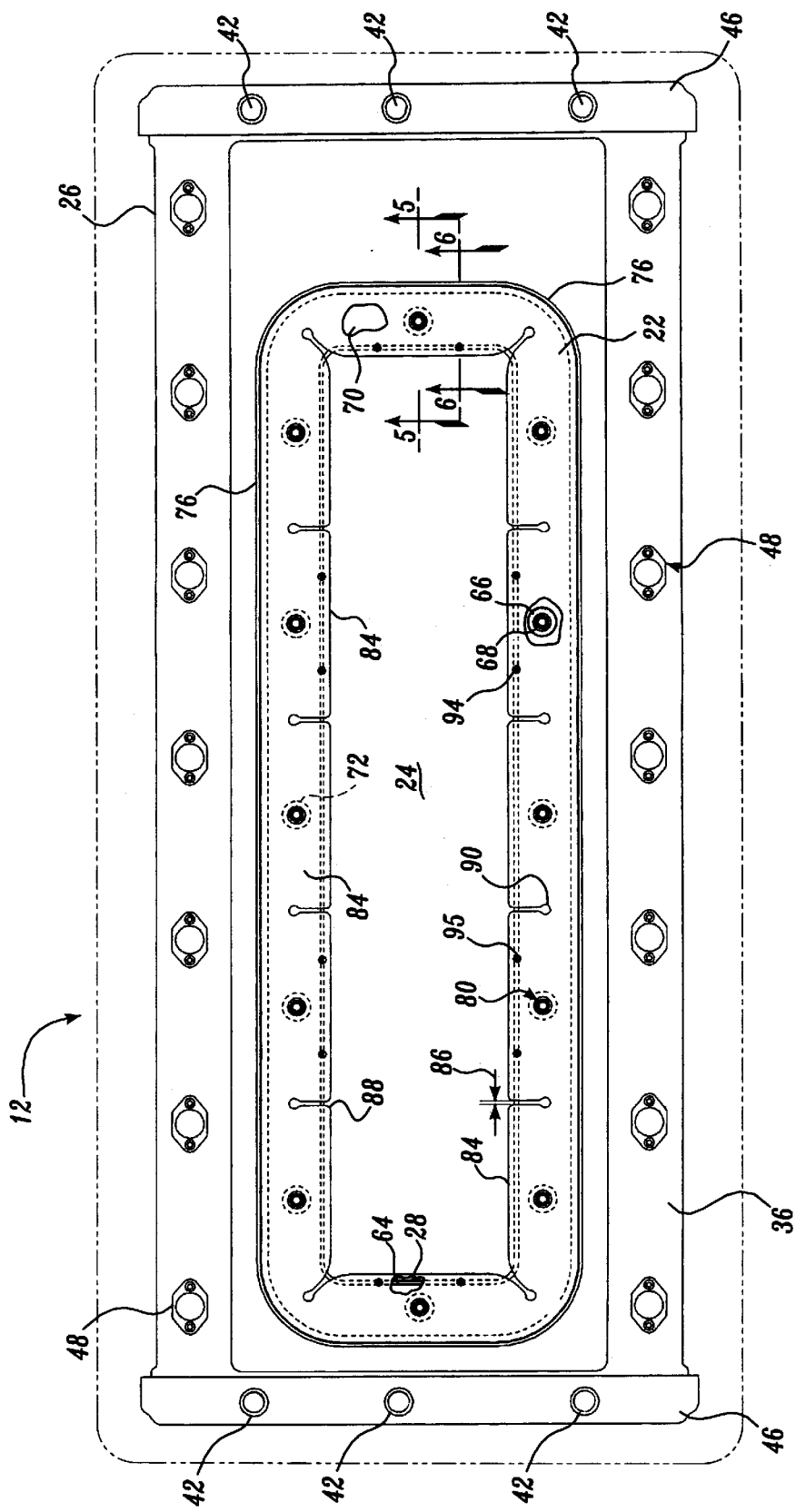
FIG. 4 is a side view of the assembly of FIG. 1.

To aid in centering the pressure relief panel 24 during assembly, a number of index pins 94 are provided between the retaining ring 22 and the support pan 26 at locations corresponding to the desired location of the relief panel's outer edge, as shown best in FIGS. 4 and 6. The number and location of index pins 94 must still allow a number of retaining ring fingers 84 to flex. Otherwise, the pressure relief panel 24 will not release properly. Depending on the precise component sizes, it may be desirable to form small, semicircular cutouts (not shown) along the inner edge of the inner seal and the outer edge of the pressure relief panel to negate any compression acting on the seal from the retaining ring 24. In any design, it is important that the index pins 94 do not pinch, catch, or bind the pressure relief panel 24 or the retaining ring 22. The index pins shown in FIGS. 1, 4 and 6 include titanium screws, cadmium plated steel countersink washers, self-locking cadmium steel plated nuts, and cadmium steel plated flat washers.

The decompression panel assembly 12 is formed by the following steps. The index pins 94 are connected to the support pan. The inner seal 70 is placed within the support pan recess 62. The fire resistant pressure panel 24 is placed over the support pan opening 28 to contact the bull nose 64. The panel peripheral edge is aligned using the index pins 94. The retaining ring 22 is positioned on top of the fire resistant pressure relief panel 24 and the inner seal, with the index pins 94 protruding through retaining ring clearance holes 95 (see FIGS. 4 and 6.) The retaining ring is positioned within the bounds of the outer ring ridge 76, contacting the stepped index ring surface 78. The fasteners 80 are installed at each mount hole 68 to connect the retaining ring 22 with the support pan 26. The grill 30 is inserted into the support pan peripheral flange 54 and is held there by the grill fasteners 56 which passed through the flange 54 and into the side surfaces 35 of the grill 30. The edge seals 46, quarter turn stud assemblies 42, and capped receptacles 48 are attached to the support pan. The decompression assembly is placed in the separation structure 14, and the adjacent panels 50 are installed.

As will be appreciated by those skilled in the art, a panel assembly formed in accordance with the present invention provides a fast, full-release pressure relief system that is fire resistant. While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A decompression panel assembly for use in a separation structure, the panel assembly comprising:

(a) a support pan having a first surface, an opening, and a raised portion surrounding the periphery of the opening and extending outwardly from the first surface;

(b) a pressure relief panel sized larger than the support pan opening; and (c) a retaining ring connecting to the support pan at the opening, the pressure relief panel being located between the raised portion and the retaining ring, the connection of the retaining ring to the support pan providing a clamping force on the pressure relief panel; the retaining ring including a number of fingers arranged to permit the retaining ring to flex during a decompression event thus allowing the pressure relief panel to fully detach from the assembly.

2. A decompression panel assembly formed according to claim 1, wherein the pressure relief panel is formed of a fire resistant fiberglass.

3. A decompression panel assembly formed according to claim 1, wherein the retaining ring is formed of nickel chromium stainless steel.

4. A decompression panel assembly formed according to claim 1, wherein the retaining ring is nonfrangible.

5. A decompression panel assembly formed according to claim 1, wherein the support pan opening, pressure relief panel, and retaining ring are each shaped as one of a rectangle and a square.

6. A decompression panel assembly formed according to claim 1, wherein the support pan includes a second surface that is opposite the first surface, the panel assembly further including a grill attached to the support pan second surface, the grill covering the entire support pan opening.

7. A decompression panel assembly formed according to claim 6, wherein the grill is formed from machined aluminum.

8. A decompression panel assembly formed according to claim 6, wherein the support pan includes a flange extending normally from the second surface, the grill being inserted into and attached to the flange.

9. A decompression panel assembly formed according to claim 6, wherein the grill, the support pan opening, the peripheral flanges, the pressure relief panel, and the retaining ring are each shaped as one of a rectangle and a square.

10. A decompression panel assembly formed according to claim 1, wherein the contacts between the retaining ring, the pressure relief panel, and the raised portion are substantially airtight contacts.

11. A decompression panel assembly formed according to claim 1, wherein the pressure relief panel is sized only slightly larger than the support pan opening, the decompression panel assembly further including a number of index pins interconnected between the retaining ring and the support pan for aligning the pressure relief panel within the clamp provided by the retaining ring and the raised portion.

12. A decompression panel assembly formed according to claim 1, wherein the raised portion has a cross-sectionally curved shape.

13. A decompression panel assembly for use in an aircraft separation structure, the panel assembly comprising:
  (a) a support pan having a first surface, an opening, and a raised portion surrounding the periphery of the opening and extending outwardly from the first surface;
  (b) a pressure relief panel shaped similar to the support pan opening shape; and
  (c) a nonfrangible retaining ring including an inner periphery having a number of spaced-apart slits extending part way into the retaining ring and an outer periphery; the retaining ring being connected to the support pan; the pressure relief panel being held between the support pan raised portion and the retaining ring; wherein during a rapid decompression event the slits allow the retaining ring to flex slightly outward to reduce the holding force applied to the pressure relief panel.

14. A decompression panel assembly formed according to claim 13, wherein the pressure relief panel is sized only slightly larger than the support pan opening, the decompression panel assembly further including a number of index pins which protrude through the retaining ring and are fastened to the support pan for use in aligning the pressure relief panel.

15. A decompression panel assembly formed according to claim 13, further including an inner seal located between the retaining ring and the support pan, the inner seal for providing an ablatant heat sink.

16. A decompression panel assembly formed according to claim 15, wherein the support pan further includes a recess surrounding the raised portion; the inner seal being located within the recess.

17. A decompression panel assembly formed according to claim 15, wherein the pressure relief panel is sized only slightly larger than the support pan opening, the decompression panel assembly further including a number of index pins interconnected between the retaining ring and the support pan for aligning the pressure relief panel.

18. A decompression panel assembly formed according to claim 13, wherein the support pan further includes a second surface, the panel assembly further including a grill attached to the support pan second surface, the grill covering the support pan opening.

19. A decompression panel assembly formed according to claim 18, wherein the grill includes a number of secondary pressure relief holes.

20. A decompression panel assembly formed according to claim 18, wherein the support pan includes a flange extending normally from the second surface, the grill being attached to the flange.

21. A decompression panel assembly formed according to claim 20, wherein the pressure relief panel is sized slightly larger than the support pan opening, the decompression panel assembly further including a number of index pins which protrude through the retaining ring and are fastened to the support pan for aligning the pressure relief panel between the retaining ring and the raised portion.

22. A decompression panel assembly formed according to claim 13, wherein the pressure relief panel is formed of a fire resistant fiberglass.

23. A decompression panel assembly formed according to claim 13, wherein the retaining ring is formed of nickel chromium stainless steel.

24. A decompression panel assembly formed according to claim 13, wherein the raised portion has a cross-sectionally curved shape.

25. A decompression panel assembly for use in an aircraft separation structure, the assembly comprising:
  (a) a support pan having a first surface, an opening, and a raised portion surrounding the periphery of the opening and extending outwardly from the first surface;
  (b) a pressure relief panel sized to cover the support pan opening; and
  (c) a retaining ring connecting to the support pan at the opening, the pressure relief panel being located between the raised portion and the retaining ring, the retaining ring being formed as a single unit having a number of segments; and
  (d) an inner seal positioned between the support pan and the retaining ring, the inner seal acting as a heat sink; wherein during a rapid decompression event the retaining ring flexes outward to allow the pressure relief panel to fully detach from the assembly.

26. A decompression panel assembly formed according to claim 25, wherein the support pan first surface includes a recess positioned around the raised portion and the inner seal is positioned in the recess.

27. A decompression panel assembly formed according to claim 26, wherein the support pan first surface further includes a index ring surface located around the recess and an outer ring ridge located around the index ring surface; the retaining ring being positioned on the support pan within the outer ring ridge and being supported by the index ring surface.

28. A decompression panel assembly formed according to claim 25, wherein the retaining ring is connected to the support pan by a number of spaced apart fasteners.

29. A decompression panel assembly formed according to claim 25, wherein the connection between the pressure relief panel and the support pan is substantially airtight.

30. A decompression panel assembly formed according to claim 25, wherein the seal is formed from fiberglass.

31. A decompression panel assembly formed according to claim 25, wherein the support pan includes a second surface that is opposite the first surface, the panel assembly further including a grill attached to the support pan second surface, the grill for preventing objects from dislodging the pressure relief panel.

32. A decompression panel assembly formed according to claim 31, wherein the grill includes a number of secondary pressure relief holes.

* * * * *